United States Patent [19]

Chouery

[11] Patent Number: 4,674,039
[45] Date of Patent: Jun. 16, 1987

[54] METHOD FOR DETERMINING WHETHER A GIVEN VALUE IS INCLUDED IN AN ORDERED TABLE OF VALUES STORED IN A COMPUTER READABLE MEMORY

[76] Inventor: Farid A. Chouery, 6738 - 19th Ave. N.W., Seattle, Wash. 98117

[21] Appl. No.: 658,987

[22] Filed: Oct. 9, 1984

[51] Int. Cl.⁴ .............................................. G06F 7/34
[52] U.S. Cl. .................................... 364/300; 364/900; 340/146.2
[58] Field of Search ... 364/200 MS File, 900 MS File, 364/300; 340/146.2

[56] References Cited

U.S. PATENT DOCUMENTS

| | | | |
|---|---|---|---|
| 2,580,768 | 1/1952 | Hamilton et al. | 371/72 |
| 2,651,457 | 9/1953 | Luhn et al. | 364/729 |
| 3,034,720 | 5/1962 | Taylor | 235/311 |
| 3,049,295 | 8/1962 | Rhodes et al. | 364/200 |
| 3,153,775 | 10/1964 | Marsh | 364/200 |
| 3,295,102 | 12/1966 | Neilson | 340/146.2 |
| 3,522,589 | 1/1971 | Thron et al. | 364/200 |
| 3,598,973 | 8/1971 | Brooks et al. | 364/405 |
| 3,643,226 | 2/1972 | Loizides et al. | 364/200 |
| 3,651,483 | 3/1972 | Plank, IV et al. | 364/200 |
| 3,736,413 | 5/1973 | Ferguson | 364/761 |
| 3,781,808 | 12/1973 | Ahearn et al. | 364/200 |
| 3,890,603 | 6/1975 | Jones et al. | 365/49 |
| 4,210,961 | 7/1980 | Whitlow et al. | 364/300 |
| 4,241,401 | 12/1980 | DeWard et al. | 364/200 |

OTHER PUBLICATIONS

"Numerical Methods", Germund Dahlquist et al., published by Prentice-Hall, Inc., pp. 230-233.

Primary Examiner—Archie E. Williams
Assistant Examiner—Thomas C. Lee
Attorney, Agent, or Firm—Christensen, O'Connor, Johnson & Kindness

[57] ABSTRACT

A method for operating a digital computer having computer readable memory means is used to determine whether a given value is included in an ordered table of values stored in the memory means. The method commences by defining lower and upper boundary positions and lower and upper boundary values. The lower and upper boundary positions are defined to be the first and last table positions, respectively, and the lower and upper boundary values are defined to be the values in the lower and upper boundary positions, respectively. An assumed position is then determined for the given value between the lower and upper boundary positions, and a test value is set equal to the value at the assumed position. The test value is then compared to the given value. If the test and given values are equal, then the given value is in the table at the assumed position. If the test value is greater than the given value, then the upper boundary position is adjusted towards the assumed position, the upper boundary value is redefined as the value at the adjusted upper boundary position, and the value of the lower boundary value is adjusted towards the given value. However, if the test value is less than the given value, then the lower boundary position is adjusted towards the assumed position, the lower boundary value is redefined as the value at the adjusted lower boundary position, and the value of the upper boundary value is adjusted towards the given value. The steps commencing with the determination of an assumed position for the given value are then repeated until the test value is equal to the given value, or until the upper and lower boundary positions are adjacent to one another. In a preferred embodiment, the assumed position is determined based upon the assumption that the values between the lower and upper boundary values change uniformly between the lower and upper boundary positions. The upper boundary position is preferably set equal to the assumed position when the test value is greater than the given value, and the lower boundary position is preferably set equal to the assumed position when the test value is less than the given value. The method of the present invention may also comprise the step of performing a binary search when a maxiumum repeat count has been equalled.

13 Claims, 6 Drawing Figures

METHOD FOR DETERMINING WHETHER A GIVEN VALUE IS INCLUDED IN AN ORDERED TABLE OF VALUES STORED IN A COMPUTER READABLE MEMORY

FIELD OF THE INVENTION

The present invention relates to a method for operating a digital computer. More particularly, the present invention relates to a method for determining whether a given value is included in an ordered table of values stored in a computer readable memory, and, if so, the position in the table at which the given value is included.

BACKGROUND OF THE INVENTION

In data processing operations, it is frequently required to create and maintain an ordered list of values in a computer readable memory, and subsequently to determine whether given values are contained within the table. If the table is very short, a straightforward approach is to sequentially search the table, testing each value to see whether it is equal to a particular given value. For longer tables, however, sequential search is too time-consuming, and a technique known as a binary search is commonly used. In the binary search technique, the middle or central value in the table is tested against the given value. If the middle and given values are equal, then given value has been found in the table, and the process is complete. If the middle and given values are not equal, then advantage is taken of the fact that the table is ordered. In particular, if the given value is less than the middle value, then the bottom half of the table is "discarded," and a new middle value is established based upon the remaining upper half of the table. The given value is then tested against the new middle value. This process is continued until a table value equal to the given value is found, or until the table has been exhausted.

SUMMARY OF THE INVENTION

The present invention provides a method for operating a digital computer having computer readable memory means to determine whether a given value is included in an ordered table of values stored in the memory means. If the given value is included in the table, then the method also determines its position. In many applications, the method of the present invention is significantly faster than prior related methods such as the binary search method.

In one preferred embodiment, the method of the present invention commences by the defining lower and upper boundary positions and lower and upper boundary values. The lower and upper boundary positions are defined to be the first and last table positions respectively, and the lower and upper boundary values are defined to be the values in the lower and upper boundary positions respectively. An assumed position is then determined for the given value between the lower and upper boundary positions, and a test value is set equal to the value at the assumed position. The test value is then compared to the given value. If the test and given values are equal, then the given value is in the table at the assumed position, and the process is complete. If the test value is greater than the given value, then the upper boundary position is adjusted towards the assumed position, the upper boundary value is redefined as the value at the adjusted upper boundary position, and the value of the lower boundary value is adjusted towards the given value. If the test value is less than the given value, then the lower boundary position is adjusted towards the assumed position, the lower boundary value is redefined as the value at the adjusted lower boundary position, and the value of the upper boundary value is adjusted towards the given value. The above-described steps, commencing with the determination of an assumed position for the given value, are then repeated until the test value is equal to the given value, or until the upper and lower boundary positions are adjacent to one another.

In a preferred embodiment, the assumed position for the given value is determined based upon the assumption that the values between the lower and upper boundary values change uniformly between the lower and upper boundary positions. The upper boundary position is preferably set equal to the assumed position when the test value is greater than the given value; and the lower boundary position is preferably set equal to the assumed position when the test value is less than the given value. In a further aspect of the invention, a maximum repeat count is initially established, and the operations commencing with the determination of an assumed position for the given value are repeated until the test value is equal to the given value, until the upper and lower boundary positions are adjacent to one another, or until such operations have been repeated a number of times equal to the maximum repeat count. The maximum repeat count may be based upon the average number of iterations that would be required to determine that the given value is not in the table using a binary search technique. If and when the maximum repeat count is exceeded, the method of the present invention may comprise a further step of performing a binary search for the given value between the upper and lower boundary positions.

DETAILED DESCRIPTION OF THE INVENTION

Figure 1:
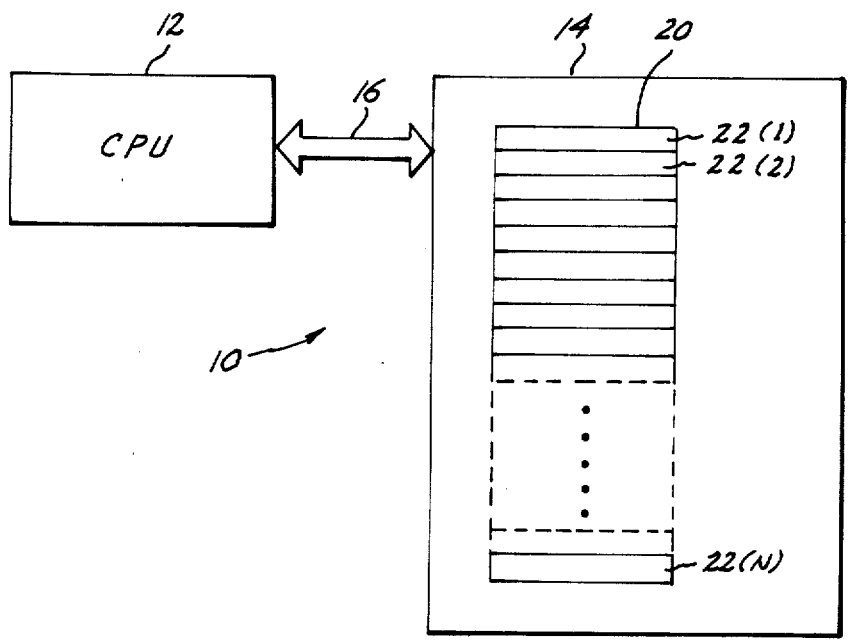
FIG. 1 is a block diagram of a computer system in which the present invention is intended to operate.

FIG. 1 sets forth a simplified block diagram of a general purpose digital computer in which the present invention is intended to operate. The computer 10 of FIG. 1 includes CPU 12 and computer readable memory 14 interconnected by a data transfer means 16 which may, for example, comprise a bus. Although memory 14 may comprise any computer readable memory means, it is preferred for the carrying out of the present invention that memory 14 comprise a random access memory device such as a semiconductor RAM memory or a magnetic disk device.

Memory 14 includes table 20 that comprises N data items 22(1) through 22(N) that occupy corresponding table positions 1 through N and that are ordered with respect to one another. For example, table 20 could comprise N numbers in numeric order or N alphanumeric data items such as names in alphabetic order. For convenience in describing the present invention, it will be assumed that the values in table 20 are stored in ascending order, although descending order would be equally suitable. In a simple computer system, the items in table 20 may be stored as a simple table in which sequentially increasing table positions have increasing data values. However, more complex arrangements may also be used, including for example a table stored in random order and an associated index pointing to the data items in sequential fashion. Such variations are well known to those skilled in the art.

Figure 2:
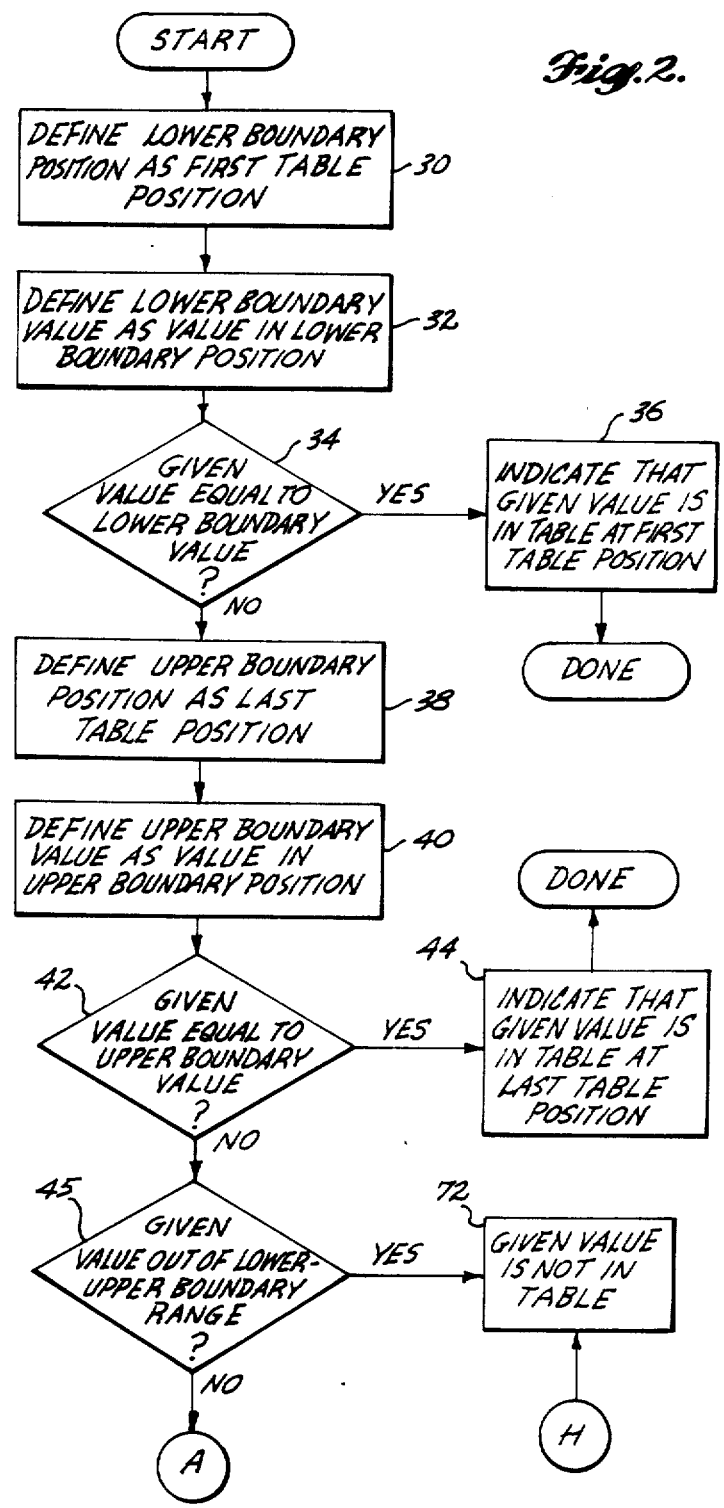
FIGS. 2-6 comprise a flow chart for controlling the operation of the computer of FIG. 1 in accordance with the present invention.

FIGS. 2-6 set forth a flow chart for controlling the operation of CPU 12 in accordance with the present invention in order to determine whether a given value is included within table 20 and, if so, its position within table 20. Referring initially to FIG. 2, program operation commences in block 30 with the definition of the lower boundary position as the first table position. The phrase "first table position" refers to the lowest ordered position in table 20. Block 32 then defines the lower boundary value as the value in the lower boundary position. The significance of the lower boundary position and the lower boundary value will be made clear below. Block 34 then checks to see whether the given value is equal to the lower boundary value. If the values are equal, then it has been determined that the given value is in the table at the lower boundary position, i.e., at the first table position. This result is indicated in block 36, at which point the process is complete.

Assuming that the test in block 34 is not satisfied, then blocks 38 and 40 perform similar operations for the last table position, defining the upper boundary position as the last table position and the upper boundary value as the value in the upper boundary position. Block 42 then checks to see whether the given value is equal to the upper boundary value. If so, then the given value is in the table at the last table position, and this result is indicated in block 44, at which point the process is complete. If the given value is not equal to the upper boundary value, then block 45 determines whether or not the given value is out of the range defined by the lower and upper boundary values. If the given value is out of such range, then the given value is not in the table. This result is indicated in block 72, at which point the process is complete.

The upper and lower boundary positions define the portion of table 20 within which the search for the given value is conducted. As described above, these positions are initially set to the first and last table positions, respectively. As will be clear below, as the search progresses, these positions become closer and closer to one another, until the given value is found or until the upper and lower boundary positions are adjacent to one another.

Figure 3:
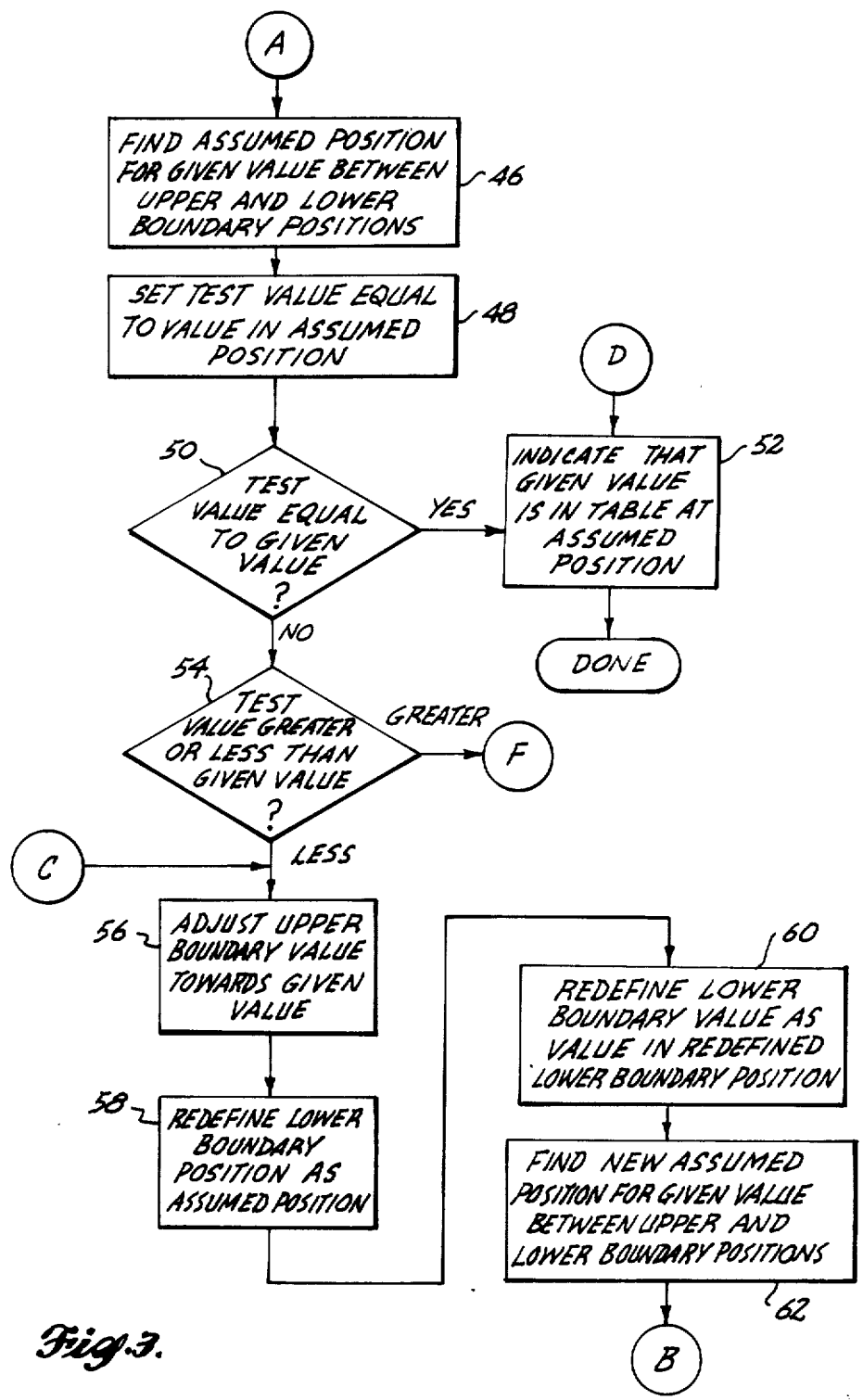
Figure 4:
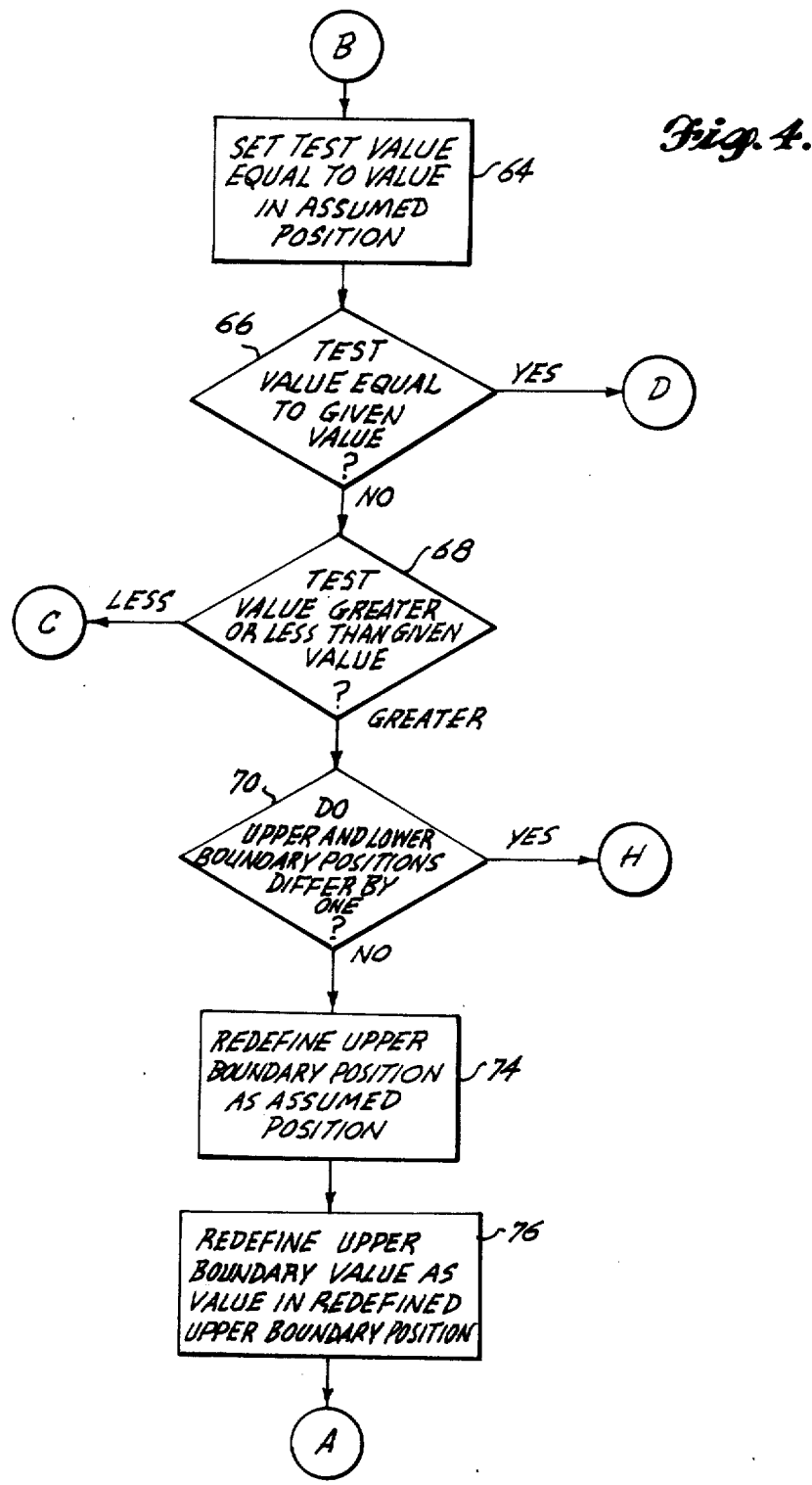

Assuming that the test in block 45 is not satisfied, then control passes to block 46 (FIG. 3). Block 46 determines an assumed position for the given value between the current upper and lower boundary positions. The method by which the assumed position is determined may vary depending on the application, i.e., depending upon the known or assumed distribution of values in table 20. One preferred method for determining the assumed position is to assume that the values in table 20 change uniformly. In such a case, the assumed position may be determined simply by linear interpolation between the upper and lower boundary positions. For example, if the lower and upper boundary positions were 100 and 200 respectively, if the lower and upper boundary values were 25 and 50 respectively, and if the given value was 30, then the assumed position by linear interpolation would be 120. Note that linear interpolation assumes that the values in table 20 are numbers. If the values in table 20 are not numbers, then any well-known technique could be used to convert them to numbers or treat them as numbers for purposes of interpolation. For example, if the values in table 20 were alphanumerical data items, then each character of such data items could be converted to or treated as its decimal ASCII equivalent.

Once the assumed position has been determined in block 46, block 48 sets a test value equal to the value in the assumed position. Block 50 then compares the test value to the given value. If they are equal, then it has been determined that the given value is in the table at the assumed position, and this result is indicated in block 52, at which point the process is complete. If the test value is not equal to the given value, then block 54 determines whether the test value is greater than or less than the given value. If the test value is less than the given value, then the boundary adjustment operations of blocks 56, 58 and 60 are performed. Block 56 adjusts the upper boundary value towards the given value. In a preferred embodiment, the adjustment of block 56 is carried out by adjusting the upper boundary value halfway towards the given value, i.e., setting the upper boundary value equal to the unweighted average of the prior upper boundary value and the given value. Other similar adjustment techniques may also be used. Block 58 then redefines the lower boundary position as the assumed position. Since the test value was determined to be less than the given value in block 54, block 54 in effect determined that the given value is not located at a position less than the current assumed position, and block 58 may therefore be understood as simply excluding such positions from subsequent searching. Block 60 then redefines the lower boundary value as the value in the redefined lower boundary position. Block 62 then determines a new assumed position for the given value. The technique used in block 62 is preferably identical to the technique employed in block 46. Block 64 (FIG. 4) then sets the test value equal to the value in the assumed position, and block 66 then compares the test value to the given value. If the test value is equal to the given value, then it has been determined that the given value is in the table at the current assumed position, and this result is indicated in block 52, at which point the process is complete. However, if the test in block 66 is not satisfied, then block 68 determines whether the test value is greater than or less than the given value. If the test value is still less than the given value, then control returns to block 56, and the above-described process from block 56 onward is repeated. However, assuming that the test value has now "switched sides" with respect to the given value, i.e., assuming that the test value is now greater than the given value, then control passes to block 70. Block 70 determines whether the upper and lower boundary positions are adjacent, i.e., whether the upper and lower boundary positions differ by one. If so, then the given value is not in the table. This result is indicated in block 72, at which point the process is complete. However, if the upper and lower boundary positions are not adjacent, then block 74 redefines the upper boundary position as the assumed position, block 76 redefines the upper boundary value as the value in the redefined upper boundary position, and control returns to block 46 of FIG. 3.

Figure 5:
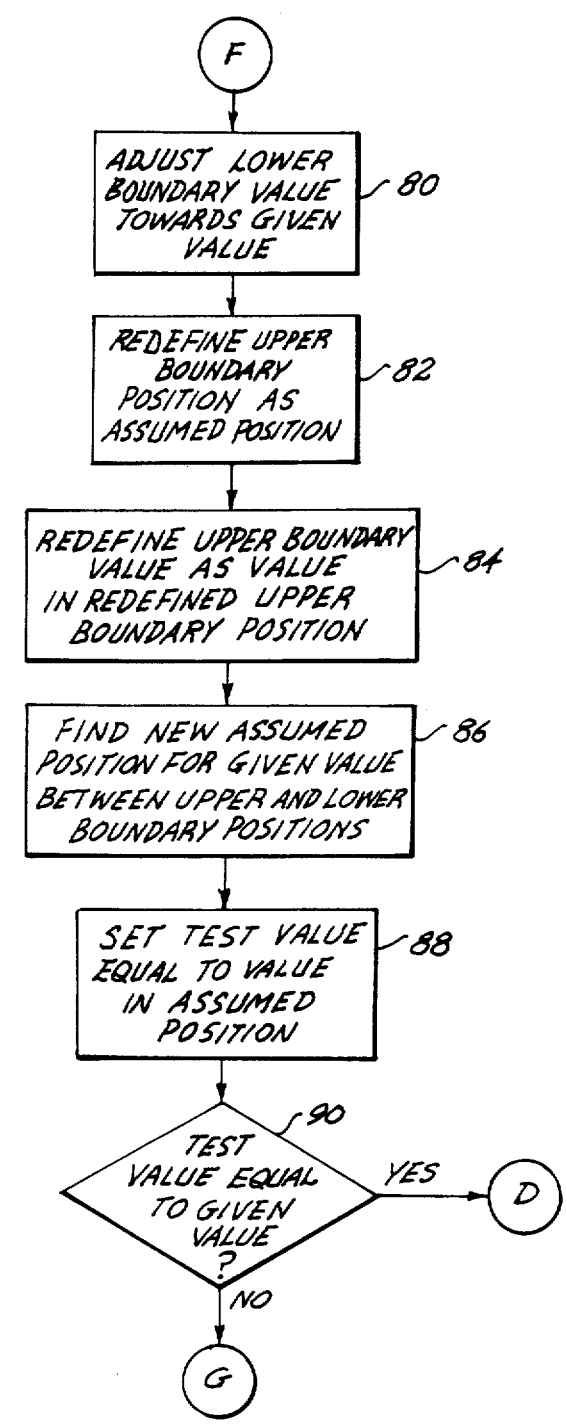
Figure 6:
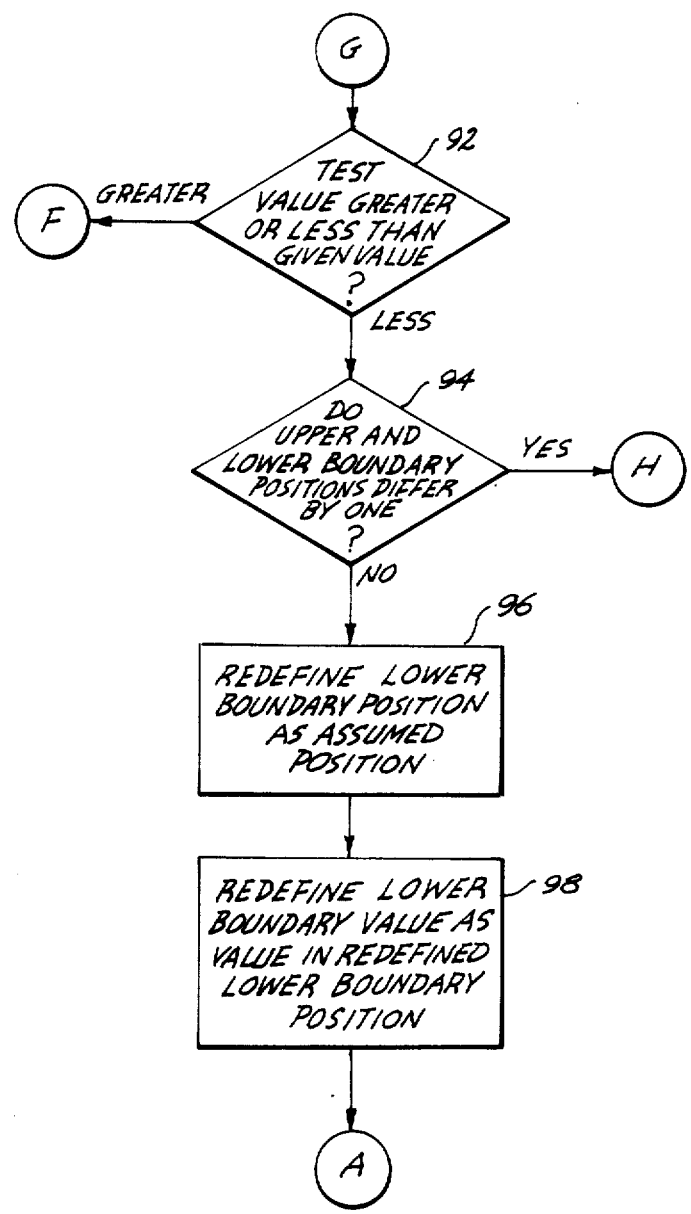

Whenever it is determined in block 54 that the test value is greater than the given value, then control passes to block 80 of FIG. 5, and the boundary adjustment operations of block 80, 82 and 84 are performed. Block 80 adjusts the lower boundary value towards the given value, the adjustment method preferably being fully analogous to the adjustment method of block 56. Block 82 then redefines the upper boundary position as the assumed position, and block 84 redefines the upper boundary value as the value in the redefined upper boundary position. Blocks 82 and 84 in effect exclude from further searching all table positions greater than the previous assumed position.

After boundary adjustment is complete, block 86 finds a new assumed position for the given value between the new upper and lower boundary positions. The technique used in block 86 is preferably identical to the technique employed in block 46. Block 88 then sets the test value equal to the value in the assumed position, and block 90 then compares the test value to the given value. If the test value is equal to the given value, then it has been determined that the given value is in the table at the current assumed position, and this result is indicated in block 52, at which point the process is complete. However, if the test in block 90 is not satisfied, then block 92 (FIG. 6) determines whether the test value is greater than or less than the given value. If the test value is still greater than the given value, then control returns to block 80, and the above-described process from block 80 onward is repeated. However, assuming that the test value has now "switched sides" with respect to the given value, i.e., assuming that the test value is now less than the given value, then control passes to block 94. Block 94 determines whether the upper and lower boundary positions are adjacent, i.e., whether the upper and lower boundary positions differ by one. If so, then the given value is not in the table, this result is indicated in block 72, at which point the process is complete. However, if the upper and lower boundary positions are not adjacent, then block 96 redefines the lower boundary position as the assumed position, block 98 redefines the lower boundary value as the value in the redefined lower boundary position, and control returns to block 46 of FIG. 3.

In a further preferred embodiment, the method of the present invention includes a safeguard to ensure that the method never requires significantly more execution time than a conventional binary search. In such an embodiment, a maximum repeat count is initially established prior to the first execution of block 46 (FIG. 3), and an iteration counter is initialized to zero. Preferably, the maximum repeat count is based upon the average number of iterations that would be required to determine that the given value is not in the table using a binary search technique, i.e., the maximum repeat count can be equal or proportional to the natural logarithm of the number of items in the table divided by the natural logorithm of two. Whenever a new test value is established, i.e., in blocks 48, 64 and 88, the iteration counter is incremented by one. Finally, immediately preceding blocks 74 and 96, a test is made to determine whether the iteration counter is equal to or greater than the maximum repeat count. If so, then a binary search for the given value is performed between the current upper and lower boundary positions. Although for most tables the method of the present invention will perform much more rapidly than a binary search, the above-described embodiment ensures that the occasional table for which the present invention performs more slowly will not significantly degrade the performance of the method.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A method for operating a digital computer that includes computer memory means to determine whether a given value is included in an ordered table of values stored in the computer memory means and, if so, the position in the table at which the given value is included, the method comprising:
    (a) defining a lower boundary position as the first table position in the computer memory means and a lower boundary value as the value in the lower boundary position;
    (b) defining an upper boundary position as the last table position in the computer memory means and an upper boundary value as the value in the upper boundary position;
    (c) determining by interpolation an assumed position for the given value in the computer memory means between the lower and upper boundary positions;
    (d) comparing the value in the assumed position to the given value, and if they are equal, then causing the computer to indicate that the given value is in the table at the assumed position, and terminating the process;
    (e) when the value at the assumed position is greater than the given value, adjusting the upper boundary position towards the assumed position, redefining the upper boundary value as the value at the adjusted upper boundary position, and adjusting the value of the lower boundary value towards the given value by setting the lower boundary value equal to an average of the unadjusted lower boundary value and the given value;
    (f) when the value at the assumed position is less than the given value, adjusting the lower boundary position towards the assumed position, redefining the lower boundary value as the value at the adjusted lower boundary position, and adjusting the value of the upper boundary value towards the given value by setting the upper boundary value equal to an average of the unadjusted upper boundary value and the given value; and,
    (g) repeating the operations of steps (c)–(f) until the value in the assumed position is equal to the given value or until the upper and lower boundary positions are adjacent to one another.

2. The method of claim 1, wherein an assumed position is determined for the given value based upon the assumption that the values between the upper and lower boundary values change uniformly between the lower and upper boundary positions.

3. The method of claim 1, wherein the upper boundary position is set equal to the assumed position when the value at the assumed position is greater than the given value, and wherein the lower boundary position is set equal to the assumed position when the value at the assumed position is less than the given value.

4. The method of claim 1, comprising the further step of establishing a maximum repeat count prior to performing step (c) for the first time, and wherein step (g)

comprises repeating the operations of steps (c)–(f) until the value in the assumed position is equal to the given value, until the upper and lower boundary positions are adjacent to one another, or until steps (c)–(f) have been repeated a number of times equal to the maximum repeat count.

5. The method of claim 4, comprising the further step of performing a binary search for the given value between the upper and lower boundary positions whenever the maximum repeat count is reached in step (g).

6. The method of claim 5, wherein the maximum repeat count is based upon the average number of iterations that would be required to determine that the given value is not in the table using a binary search technique.

7. The method of claim 6, wherein the maximum repeat count is proportional to the natural logarithm of the number of positions in the table divided by the natural logarithm of two.

8. A method for operating a digital computer that includes computer memory means to determine whether a given value is included in an ordered table of values stored in the computer memory means and, if so, the position in the table at which the given value is included, the method comprising:
   (a) defining a lower boundary position as the first table position in the computer memory means and a lower boundary value as the value in the lower boundary position;
   (b) defining an upper boundary position as the last table position in the computer memory means and an upper boundary value as the value in the upper boundary position;
   (c) determining by interpolation an assumed position for the given value in the computer memory means between the lower and upper boundary positions;
   (d) comparing the value in the assumed position to the given value, proceeding to step (e) if they are equal, proceeding to step (f) if the value in the assumed position is greater than the given value, and proceeding to step (k) if the value in the assumed position is less than the given value;
   (e) causing the computer to indicate that the given value is in the table at the assumed position, and terminating the process;
   (f) adjusting the upper boundary position towards the assumed position, redefining the upper boundary value as the value at the adjusted upper boundary position, and adjusting the value of the lower boundary value towards the given value by setting the lower boundary value equal to an average of the unadjusted lower boundary value and the given value;
   (g) determining by interpolation an assumed position for the given value in the computer memory means between the lower and upper boundary positions;
   (h) comparing the value in the assumed position to the given value, proceeding to step (e) if they are equal, proceeding to step (f) if the value in the assumed position is greater than the given value, and proceeding to step (i) if the value in the assumed position is less than the given value;
   (i) comparing the upper and lower boundary positions, and proceeding to step (p) if they are adjacent to one another, and proceeding to step (j) if they are not adjacent to one another;
   (j) adjusting the lower boundary position towards the assumed position, redefining the lower boundary value as the value at the adjusted lower boundary position, and proceeding to step (c);
   (k) adjusting the lower boundary position towards the assumed position, redefining the lower boundary value as the value of the adjusted lower boundary position, and adjusting the value of the upper boundary value towards the given value by setting the upper boundary value equal to an average of the unadjusted upper boundary value and the given value;
   (l) determining by interpolation an assumed position for the given value in the computer memory means between the lower and upper boundary positions;
   (m) comparing the value in the assumed position to the given value, proceeding to step (e) if they are equal, proceeding to step (n) if the value in the assumed position is greater than the given value, and proceeding to step (k) if the value in the assumed position is less than the given value;
   (n) comparing the upper and lower boundary positions, and proceeding to step (p) if they are adjacent to one another, and proceeding to step (o) if they are not adjacent to one another;
   (o) adjusting the upper boundary position towards the assumed position, redefining the upper boundary value as the value of the adjusted upper boundary position, and proceeding to step (c); and
   (p) causing the computer to indicate that the given value is not in the table, and terminating the process.

9. The method of claim 8, wherein an assumed position is determined for the given value in steps (c), (g) and (l), based on the assumption that the values between the upper and lower boundary values change uniformly between the lower and upper boundary positions.

10. The method of claim 8, wherein in the upper boundary position is set equal to the assumed position in steps (f) and (o), and wherein the lower boundary position is set equal to the assumed position in steps (j) and (k).

11. The method of claim 8, comprising the further step of establishing a maximum repeat count prior to performing step (c) for the first time, wherein an iteration counter is incremented by one each time that a new assumed position is determined in step (c), (g) or (l), and wherein steps (i) and (n) include comparing the iteration counter to the maximum repeat count whenever the upper and lower boundary positions are not adjacent to one another, and performing a binary search for the given value between the upper and lower boundary positions whenever the iteration counter is greater than or equal to the maximum repeat count.

12. The method of claim 11, wherein the maximum repeat count is based upon the average number of iterations that would be required to determine that the given value is not in the table using a binary search technique.

13. The method of claim 12, wherein the maximum repeat count is proportional to the natural logarithm of the number of positions in the table divided by the natural logarithm of two.

* * * * *